United States Patent
Wu

(10) Patent No.: US 11,797,077 B2
(45) Date of Patent: Oct. 24, 2023

(54) LOW POWER DOCKING STATION AND POWER CONSUMPTION MONITORING METHOD THEREOF

(71) Applicant: JIANGXI KINGTRON TECHNOLOGY CO., LTD., Ganzhou (CN)

(72) Inventor: Shihong Wu, Ganzhou (CN)

(73) Assignee: JIANGXI KINGTRON TECHNOLOGY CO., LTD., Ganzhou (CN)

( * ) Notice: Subject to any disclaimer, the term of this patent is extended or adjusted under 35 U.S.C. 154(b) by 0 days.

(21) Appl. No.: 17/707,377

(22) Filed: Mar. 29, 2022

(65) Prior Publication Data

US 2023/0236657 A1 Jul. 27, 2023

(30) Foreign Application Priority Data

Jan. 25, 2022 (CN) .......................... 202210090081.3

(51) Int. Cl.
  *G06F 1/26* (2006.01)
  *G06F 1/32* (2019.01)
  *G06F 1/3296* (2019.01)
  *G06F 13/40* (2006.01)

(52) U.S. Cl.
  CPC ........ *G06F 1/3296* (2013.01); *G06F 13/4081* (2013.01)

(58) Field of Classification Search
  CPC .......................... G06F 1/3296; G06F 13/4081
  See application file for complete search history.

(56) References Cited

U.S. PATENT DOCUMENTS

| | | | | |
|---|---|---|---|---|
| 10,667,787 B2* | 6/2020 | Broad | .................. | A61B 8/5246 |
| 2004/0142600 A1* | 7/2004 | Metz | ....................... | G06F 1/266 |
| | | | | 439/638 |
| 2005/0060467 A1* | 3/2005 | Wieck | ................... | G06F 13/387 |
| | | | | 710/303 |
| 2010/0295384 A1* | 11/2010 | Kobayashi | ............ | G06F 13/385 |
| | | | | 307/154 |
| 2013/0311801 A1* | 11/2013 | Kong | .................... | G06F 1/3206 |
| | | | | 713/320 |
| 2014/0087686 A1* | 3/2014 | Lee | ......................... | H04W 4/90 |
| | | | | 455/404.1 |
| 2017/0177049 A1* | 6/2017 | Hsiao | ...................... | G06F 1/263 |

\* cited by examiner

*Primary Examiner* — Mohammed H Rehman
(74) *Attorney, Agent, or Firm* — Li & Cai Intellectual Property (USA) Office

(57) ABSTRACT

A low power docking station and a power consumption monitoring method thereof are provided. The low power docking station includes a processing module, a monitoring module, a power supply module, and a power supply control module. The processing module is used for interpreting, transcoding, and distributing the input data to peripheral ports. The monitoring module is used for monitoring whether or not the plurality of peripheral ports is connected to a peripheral device to generate a corresponding one of a monitoring signal. The power supply module is used for supplying power to the plurality of peripheral ports, the processing module, and the monitoring module. The power supply control module is connected to the monitoring module and the power supply module. The power supply control module is used for controlling the power supply module to output power according to the monitoring signal.

6 Claims, 5 Drawing Sheets

LOW POWER DOCKING STATION AND POWER CONSUMPTION MONITORING METHOD THEREOF

CROSS-REFERENCE TO RELATED PATENT APPLICATION

This application claims the benefit of priority to China Patent Application No. 202210090081.3, filed on Jan. 25, 2022 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a low power docking station and a power consumption monitoring method thereof.

BACKGROUND OF THE DISCLOSURE

A docking station, also known as port replicator, is an peripheral device used in computer systems and portable computer systems. The docking station allows a laptop to easily connect with a plurality of accessories or peripheral devices (e.g., a power adapter, a network cable, a mouse, an external keyboard, a printer, and an external monitor) in one-step by duplicating or even extending ports of the laptop.

In conventional docking stations, USB/WUSB docking stations are mostly designed to be plug-and-play. In other words, after connecting a computer host by plugging in a USB cable, a USB data cable, or a wireless connection, all the drivers in the docking station will start work, and the internal modules related to each of external ports will be powered on and start working. Generally, the docking station can provide a plurality of peripheral device ports. If some of the peripheral device ports are not connected to a corresponding peripheral device (e.g., the printer or the monitor is not connected), the graphics or video modules inside the docking station will not automatically stop processing graphics, text, video, and other data from the computer host, resulting in wasted power consumption of the docking station.

SUMMARY OF THE DISCLOSURE

In response to the above-referenced technical inadequacies, the present disclosure provides a low power docking station that can reduce internal power consumption when no peripheral device is correspondingly connected to peripheral ports.

In a first aspect, the present disclosure provides a low power docking station including a bus port and a plurality of peripheral ports. The low power docking station is connected to a terminal through the bus port so as to obtain an input current and input data from the terminal, and the low power docking station is connected to a peripheral device through the plurality of peripheral ports so as to transmit an output current and output data. The low power docking station includes a processing module, a monitoring module, a power supply module, and a power supply control module. One end of the processing module is connected to the bus port, and another end of the processing module is correspondingly connected to the plurality of peripheral ports. The processing module is used for interpreting, transcoding, and distributing the input data to the plurality of peripheral ports. One end of the monitoring module is correspondingly connected to the plurality of peripheral ports. The monitoring module is used for monitoring whether or not the plurality of peripheral ports is connected to the peripheral device, so as to correspondingly generate a monitoring signal. One end of the power supply module is connected to yet another end of the processing module, and another end of the power supply module is connected to another one of the monitoring module. The power supply module is used for supplying power to the plurality of peripheral ports, the processing module, and the monitoring module. One end of the power supply control module is connected to yet another end of the monitoring module, and another end of the power supply control module is connected to yet another end of the power supply module. The power supply control module is used for controlling the power supply module to output power according to the monitoring signal, so as to realize a power supply control for the processing module and the plurality of peripheral ports.

In the first aspect of the present disclosure, connection status of the plurality of peripheral ports can be monitored in real time through the monitoring module, that is, whether or not the plurality of peripheral ports is connected to the peripheral device, and the power supply control module controls control the power supply module to output power to the processing module and the plurality of peripheral ports according to the connection status. In this case, the plurality of peripheral ports in idle state can effectively reduce the power consumption of the internal components (such as processing modules, etc.) of the docking station, and can extend a service life of the docking station.

In addition, in the first aspect of the present disclosure, preferably, the plurality of peripheral ports is at least one of a driver port, a display port, a keyboard port, a printer port, a scanner port, a universal serial bus (USB) flash disk port, a hard disk port, a projector port, and an audio port. Thereby, types of the plurality of peripheral ports can be enriched.

In addition, in the first aspect of the present disclosure, preferably, the processing module includes a video data processing module, an audio data processing module, and a graphic data processing module. The one end of the power supply module is correspondingly connected to the video data processing module, the audio data processing module, and the graphic data processing module. Thereby, data such as video, audio, graphics, and text can be conveniently processed by the processing module.

In addition, in the first aspect of the present disclosure, preferably, the monitoring signal includes an access signal and a non-access signal. When the plurality of peripheral ports is connected to the peripheral device, the monitoring module generates the access signal. When the plurality of peripheral ports is not connected to the peripheral device, the monitoring module generates the non-access signal. The power supply control module controls the power supply module to continuously output a power supply voltage and a power supply current to the processing module according to the access signal. The power supply control module controls the power supply module to interrupt an output voltage and an output current to the processing module according to the non-access signal. Thereby, it is convenient to control the working states of the processing module and the plurality of peripheral ports through the access signal and the non-access signal.

In addition, in the first aspect of the present disclosure, preferably, the plurality of peripheral ports includes a first peripheral port, a second peripheral port, and a third peripheral port. The video data processing module is connected to the first peripheral port, the audio data processing module is connected to the second peripheral port, and the graphic data processing module is connected to the third peripheral port. The monitoring module is correspondingly connected to the first peripheral port, the second peripheral port, and the third peripheral port. The power supply module is correspondingly connected to the first peripheral port, the second peripheral port, and the third peripheral port. The monitoring module monitors a connection state of each of the first peripheral port, the second peripheral port, and the third peripheral port, and correspondingly generates the access signal or the non-access signal. In this case, it is convenient to monitor the connection status of each of the plurality of peripheral ports separately, and the power consumption of the plurality of peripheral ports that is not connected to the peripheral device and the power consumption corresponding to the processing module can be reduced. Thereby, the power consumption of the docking station can be further reduced.

In addition, in the first aspect of the present disclosure, preferably, the power supply module includes a voltage conversion module and a current limiting module, and the voltage conversion module and the current limiting module are connected in series. Thereby, the conversion and output of the supply voltage and the supply current can be facilitated.

In a second aspect, the present disclosure provides a power consumption monitoring method for a low power docking station. The low power docking station including a bus port and a plurality of peripheral ports, the power consumption monitoring method comprising: connecting to a terminal through the bus port; monitoring whether or not the plurality of peripheral ports is connected to a peripheral device by the monitoring module, and generates a monitoring signal; controlling the power supply module to output power according to the monitoring signal by a power supply control module, so as to realize a power supply control for a processing module and the plurality of peripheral ports.

In the second aspect of the present disclosure, after connecting to the terminal, each of modules in the docking station will automatically power on and start working. The connection status of the plurality of peripheral ports can be monitored in real time through the monitoring module, and the power supply control module controls control the power supply module to output power to the processing module and the plurality of peripheral ports according to the connection status. In this case, the plurality of peripheral ports in idle state can effectively reduce the power consumption of the internal components (such as processing modules, etc.) of the docking station, and can extend a service life of the docking station.

In addition, in the second aspect of the present disclosure, preferably, the power consumption monitoring method further comprising: generating an access signal when the monitoring module monitors that the plurality of peripheral ports is connected to the peripheral device; controlling the power supply module to continuously output a power supply voltage and a power supply current to the processing module according to the access signal by the power supply control module; generating a non-access signal when the monitoring module monitors that the plurality of peripheral ports is not connected to the peripheral device; or controlling the power supply module to interrupt the power supply voltage and the power supply current to the processing module according to the non-access signal by the power supply control module. Thereby, it is convenient to control the working states of the processing module and the plurality of peripheral ports through the access signal and the non-access signal.

In addition, in the second aspect of the present disclosure, preferably, the processing module includes a video data processing module, an audio data processing module, and a graphic data processing module. The plurality of peripheral ports includes a first peripheral port, a second peripheral port, and a third peripheral port. The video data processing module is connected to the first peripheral port, the audio data processing module is connected to the second peripheral port, and the graphic data processing module is connected to the third peripheral port. Therefore, it is convenient for different ports to output different data.

In addition, in the second aspect of the present disclosure, preferably, the monitoring module monitors a connection state of each of the first peripheral port, the second peripheral port, and the third peripheral port, and correspondingly generates the access signal or the non-access signal. Thereby, each of the plurality of peripheral ports can be easily and independently controlled.

In the present disclosure, connection status of the plurality of peripheral ports can be monitored in real time through the monitoring module, that is, whether or not the plurality of peripheral ports is connected to peripheral devices, and the power supply control module controls control the power supply module to output power to the processing module and the plurality of peripheral ports according to the connection status. In this case, the plurality of peripheral ports in idle state can effectively reduce the power consumption of the internal components (such as processing modules, etc.) of the docking station, and can extend a service life of the docking station.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
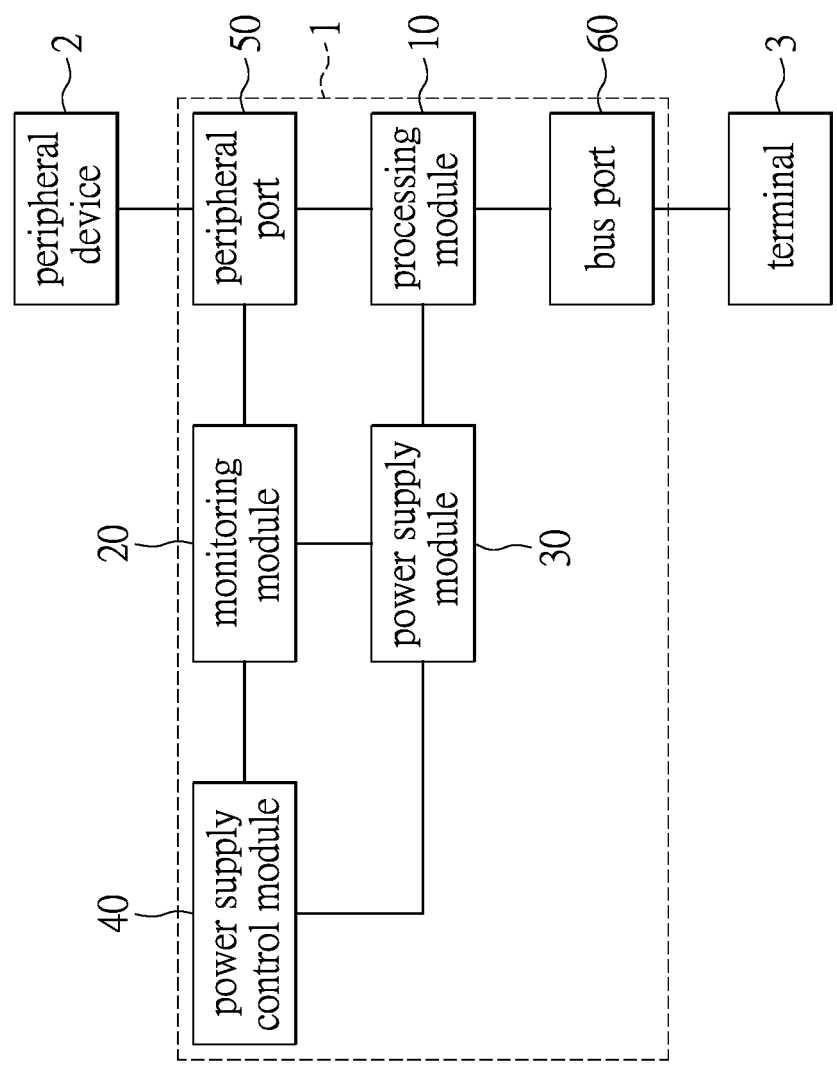
FIG. 1 is a block diagram of an example of a low power docking station system according to an embodiment of the present disclosure.

Referring to the drawings, preferred embodiments of the present disclosure are described in detail below. In the following description, the same reference numerals are assigned to the same components, and overlapping descriptions are omitted. In addition, the drawings are only schematic diagrams, and the ratio of the size of the elements to each other or the shape of the elements may be different from the actual elements.

FIG. 1 is a block diagram of an example of a low power docking station system according to an embodiment of the present disclosure.

Referring to FIG. 1, the low power docking station 1 (hereinafter referred to as a docking station 1) involved in the present embodiment may include a processing module 10, a monitoring module 20, a power supply module 30, a power supply control module 40, a plurality of peripheral ports 50, and a bus port 60. The docking station 1 is connected to a terminal 3 by the bus port 60, so as to obtain an input current and input data from the terminal 3. The docking station 1 is connected to a peripheral device 2 by the plurality of peripheral ports 50, so as to transmit an output current and output data. Naturally, the peripheral device 2 can also be used as an input device such as a mouse, a keyboard, etc. to control the terminal through the docking station 1.

Specifically, in the present embodiment, one end of the processing module 10 is connected to the bus port 60, and another end of the processing module 10 is correspondingly connected to the plurality of peripheral ports 50. The processing module 10 is used for interpreting, transcoding, and distributing the input data to the plurality of peripheral ports 50. One end of the monitoring module 20 is correspondingly connected to the plurality of peripheral ports 50, and the monitoring module 20 is used for monitoring whether or not the plurality of peripheral ports 50 is connected to the peripheral device 2, so as to correspondingly generate a monitoring signal. One end of the power supply module 30 is connected to yet another end of the processing module 10, and another end of the power supply module 30 is connected to another one of the monitoring module 20. The power supply module 30 is used for supplying power to the plurality of peripheral ports 50, the processing module 10, and the monitoring module 20. One end of the power supply control module 40 is connected to yet another end of the monitoring module 20, and another end of the power supply control module 40 is connected to yet another end of the power supply module 30. The power supply control module 40 is used for controlling the power supply module 30 to output power according to the monitoring signal, so as to realize a power supply control for the processing module 10 and the plurality of peripheral ports 50.

In the present embodiment, connection status of the plurality of peripheral ports 50 can be monitored in real time through the monitoring module 20, that is, whether or not the plurality of peripheral ports 50 is connected to the peripheral device 2, and the power supply control module 40 controls control the power supply module 30 to output power to the processing module 10 and the plurality of peripheral ports 50 according to the connection status. In this case, the plurality of peripheral ports 50 in idle state can effectively reduce the power consumption of the internal components (such as processing modules, etc.) of the docking station, and can extend a service life of the docking station.

In some examples, the terminal may be a computer, a tablet, or a mobile phone, etc. After the docking station 1 is connected to the terminal, the terminal provides plug-and-play power and device drivers to the docking station. Thereby, each of the modules in the docking station 1 can be driven to start working.

In some examples, the plurality of peripheral ports 50 is at least one of a driver port, a display port, a keyboard port, a printer port, a scanner port, a universal serial bus (USB) flash disk port, a hard disk port, a projector port, and an audio port. Thereby, the types of peripheral ports can be enriched to improve the applicability of the docking station 1.

Figure 2:
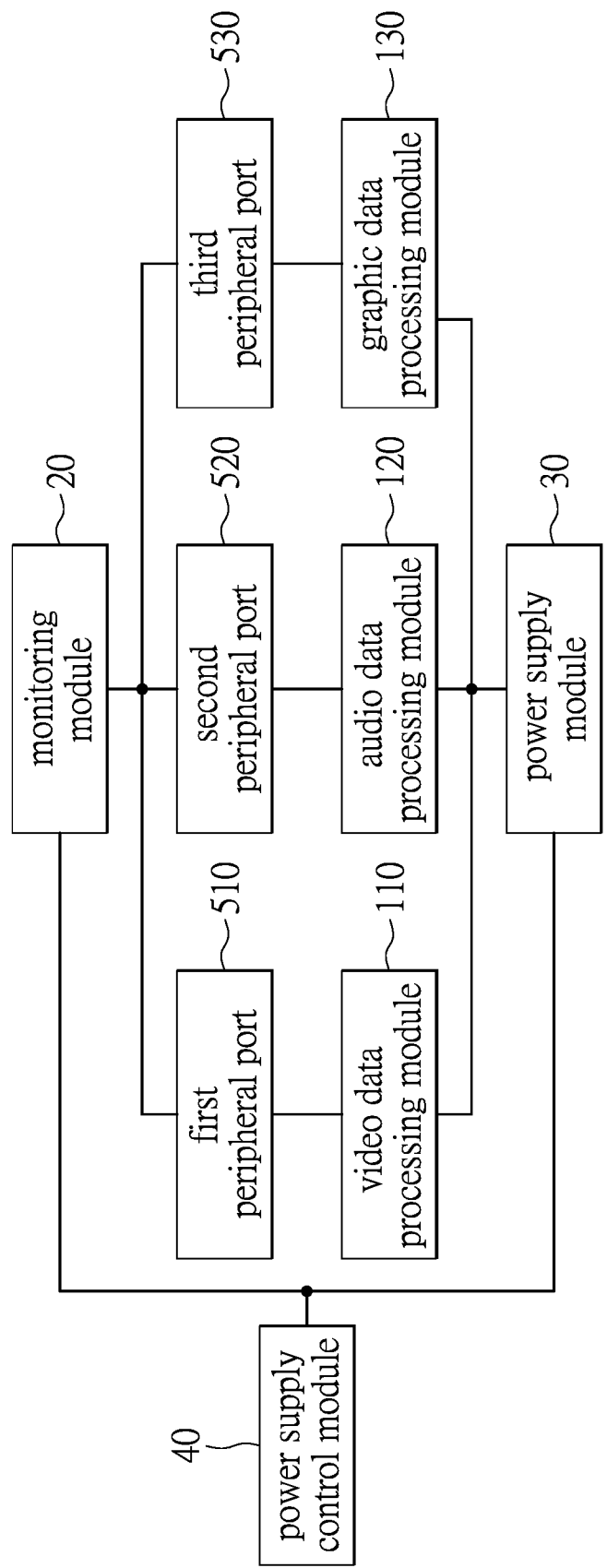
FIG. 2 is a block diagram of an example of a low power docking station according to the embodiment of the present disclosure.
Figure 3:
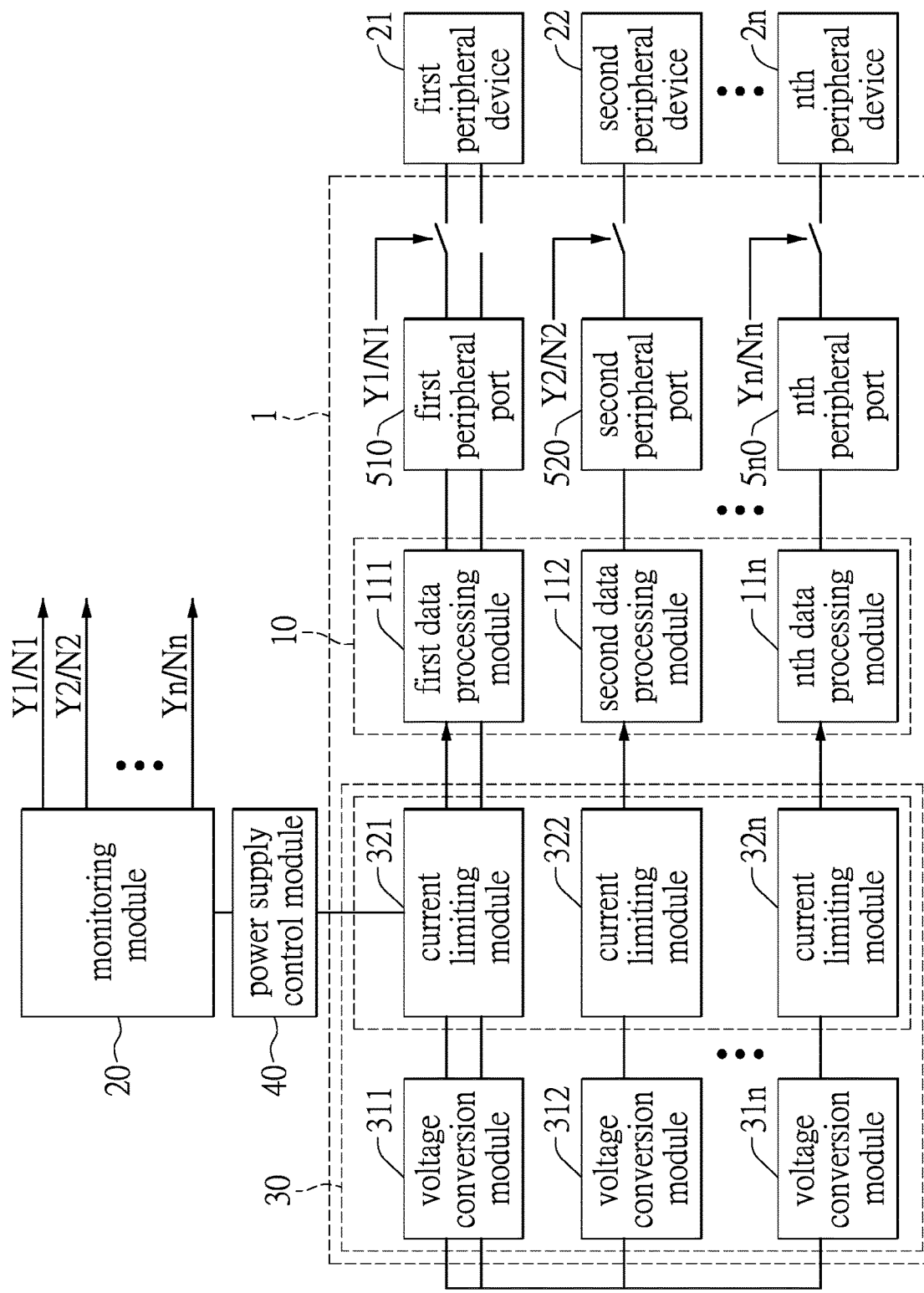
FIG. 3 is a functional block diagram of another example of a low power docking station system according to the embodiment of the present disclosure.

FIG. 2 is a block diagram of an example of the low power docking station according to the embodiment of the present disclosure, and FIG. 3 is a functional block diagram of another example of a low power docking station system according to the embodiment of the present disclosure.

Referring to FIG. 2 and FIG. 3, in the present embodiment, the processing module 10 includes a video data processing module 110, an audio data processing module 120, and a graphic data processing module 130. The one end of the power supply module 30 is correspondingly connected to the video data processing module 110, the audio data processing module 120, and the graphic data processing module 130. Thereby, it is convenient to process video, audio, graphics, and other data through the processing module 10, and each of data processing modules can be responsible for interpreting, transcoding, and distributing video, audio, graphics, and other data at the same time.

In the present embodiment, different data processing modules can be disposed on the ports according to the type of the plurality of peripheral ports 50. In some examples, the video data processing module 110 can be disposed on the display port or the projector port, the audio data processing module 120 can be disposed on the audio port, and the graphic data processing module 130 can be disposed on the printer port. Moreover, in some examples, at least two of the video data processing module 110, the audio data processing module 120, and the graphic data processing module 130 can be simultaneously disposed on a same port. Thereby, the types of data can be handled on the same port.

In the present embodiment, the monitoring signal includes an access signal and a non-access signal. When the plurality of peripheral ports 50 is connected to the peripheral device 2, the monitoring module 20 generates the access signal. When the plurality of peripheral ports 50 is not connected to the peripheral device 2, the monitoring module 20 generates the non-access signal. The power supply control module 40 can control the power supply module 30 to continuously output a power supply voltage and a power supply current to the processing module 10 according to the access signal. The power supply control module 40 can control the power supply module 30 to interrupt an output voltage and an output current to the processing module 10 according to the non-access signal. Thereby, the working states of the processing module 10 and the plurality of peripheral ports 50 can be controlled conveniently through the access signal and the non-access signal.

In some examples, when the monitoring module 20 monitors that any one or more the plurality of peripheral ports 50 is connected to the peripheral device 2, the access signal to be generated is fed back to the power supply control module 40 and the power supply control module 40 controls the power supply module 30 to continuously provide the processing module 10 with a working voltage and a working current. That is, the working voltage and the working current are simultaneously provided to each of the data processing modules (e.g., the video data processing module 110, the audio data processing module 120, the graphic data processing module 130, etc.) in the processing module 10.

In the present embodiment, the plurality of peripheral ports 50 can include a first peripheral port 510, a second peripheral port 520, and a third peripheral port 530. The video data processing module 110 can be connected to the first peripheral port 510, the audio data processing module 120 can be connected to the second peripheral port 520, and the graphic data processing module 130 is connected to the third peripheral port 530. The monitoring module 20 can be correspondingly connected to the first peripheral port 510, the second peripheral port 520, and the third peripheral port 530. The power supply module 30 can be correspondingly connected to the first peripheral port 510, the second peripheral port 520, and the third peripheral port 530. The monitoring module 20 can monitor a connection state of each of the first peripheral port 510, the second peripheral port 520, and the third peripheral port 530, and correspondingly generates the access signal or the non-access signal. In this case, it is convenient to monitor the connection status of each of the plurality of peripheral ports separately, and the power consumption of the plurality of peripheral ports that is not connected to the peripheral device and the power consumption corresponding to the processing module can be reduced. Thereby, the power consumption of the docking station can be further reduced.

The above example provides three peripheral ports and corresponding three types of processing modules, but the present disclosure is not limited thereto. Specifically, referring to FIG. 1, the plurality of peripheral ports 50 may include a first peripheral port, a second peripheral port 520, . . . , and a nth peripheral port 5n0, etc., and the data processing modules 10 may include a first data processing module 111, a second data processing module 112, . . . , and a nth data processing module 11n, etc. Correspondingly, the peripheral device 2 may include a first peripheral device 21, a second peripheral device 22, . . . , and a nth peripheral device 2n, etc.

In this case, the monitoring module 20 may monitor the connection status of each of the n peripheral ports, and generate a corresponding access signal Y or non-access signal N. For example, the access signal Y1 or the non-access signal N1 may be generated when the connection states of the first peripheral port 510 and the first peripheral device 21 are be monitored, . . . , the access signal Yn or the non-access signal Nn may be generated when the connection states of the nth peripheral port 5n0 and the nth peripheral device 2n are be monitored, and other examples are omitted to introduce one by one. Thereby, the connection status of each of the ports can be easily and fully monitored, the ports connected to the peripheral device and the corresponding data processing module can be powered normally for data processing and transmission, and the ports that are not connected to the peripheral device and the corresponding data processing module can interrupt power-on, data processing, and transmission. Thereby, the power consumption of the docking station 1 can be further reduced.

Referring to FIG. 3, in the present embodiment, the power supply module 30 may include a voltage conversion module 311, a voltage conversion module 312, . . . , and a voltage conversion module 31n, etc., and a current limiting module 321, a current limiting module 322, . . . , and a current limiting module 32n, etc. Each of the voltage limiting modules can be connected to a corresponding one of the current limiting modules in turn, and can be connected to a corresponding one of the data processing modules. In other words, the voltage conversion module 311, the current limiting module 321, the first data processing module 111, and the first peripheral port can be connected in series, . . . , and the voltage conversion module 31n, the current limiting module 32n, the nth data processing module 11n, and the nth peripheral port can be connected in series. Each of the current limiting modules can be connected to the power supply control module 40, respectively. The voltage conversion module can be used for voltage conversion and output by implementing with devices such as voltage converters, and the current limiting module can be used for controlling the on-off of the supply current on a corresponding branch or reduce an output of the supply current under the control of the power supply control module 40 by implementing with devices such as current limiters.

Figure 4:
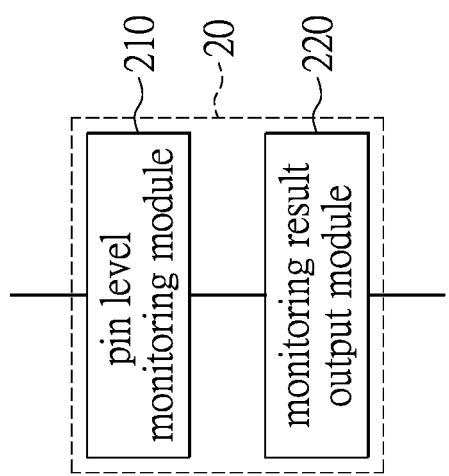
FIG. 4 is a functional block diagram of an example of a low power docking station system according to the embodiment of the present disclosure.

FIG. 4 is a functional block diagram of an example of a low power docking station system according to the embodiment of the present disclosure.

Referring to FIG. 4, in some examples, the monitoring module 20 may include a pin level monitoring module 210 and a monitoring result output module 220. The pin level monitoring module 210 and the monitoring result output module 220 can be connected in series. The pin level monitoring module 210 can be used for monitoring the level of pins of the plurality of peripheral ports, that is, to monitor a reset status of the pins of the plurality of peripheral ports. When the pins of the plurality of peripheral ports are reset, the pin level monitoring module 210 monitors a low level. In other words, the plurality of peripheral ports is not connected to the peripheral device at this time. When the pins of the plurality of peripheral ports are set, the pin level monitoring module 210 monitors a high level. In other words, the plurality of peripheral ports is connected to the peripheral device at this time. Thereby, the connection state of the plurality of peripheral ports can be easily monitored.

In other examples, the monitoring module 20 may be disposed a multi-channel pin level monitoring module 210 and a monitoring result output module 220 that correspond to peripheral ports 50. Thereby, the connection state of each of the plurality of peripheral ports can be easily and fully monitored.

Figure 5:
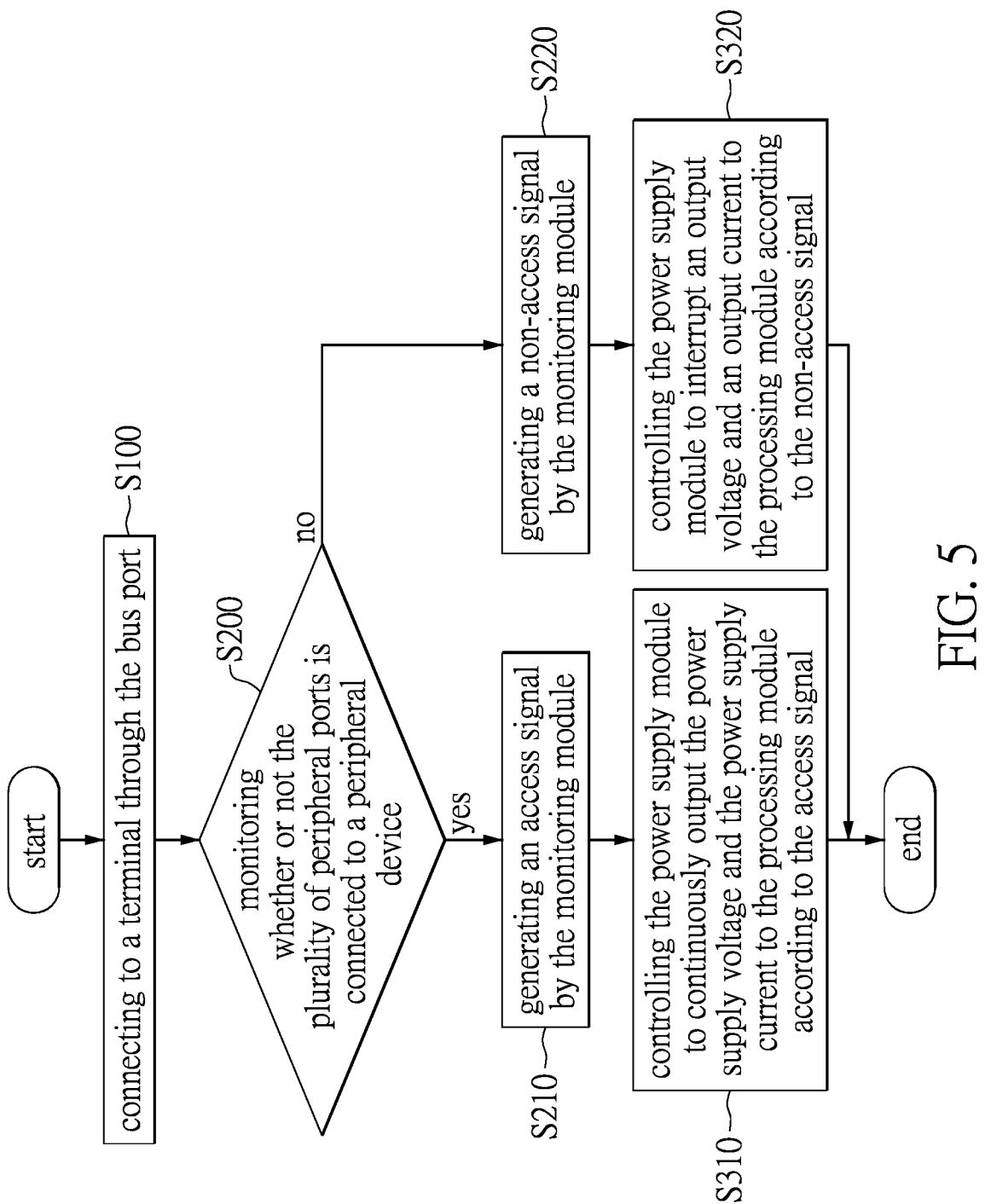
FIG. 5 is a flowchart of a power consumption monitoring method according to the embodiment of the present disclosure.

FIG. 5 is a flowchart of a power consumption monitoring method according to the embodiment of the present disclosure.

Referring to FIG. 5, the present disclosure also provides a power consumption monitoring method for a low power docking station 1, and the low power docking station 1 include a bus port 60 and a plurality of peripheral ports 50. The power consumption monitoring method includes:

Implementing a step S100 which includes: connecting to a terminal 3 through the bus port 60.

Implementing a step S200 which includes: monitoring whether or not the plurality of peripheral ports 50 is connected to a peripheral device 2 by the monitoring module 20, and generates a monitoring signal.

Implementing a step S300 which includes: controlling the power supply module 30 to output power according to the monitoring signal by a power supply control module 40, so as to realize a power supply control for a processing module 10 and the plurality of peripheral ports 50.

In the present disclosure, after the docking station 1 is connected to the terminal 3, each of the modules in the docking station 1 will automatically power on and start working. At this time, the monitoring module 20 can monitor the connection status of the plurality of peripheral ports 50 in real time, and the power supply control module 40 controls the power supply module 30 to output power to the processing module 10 and the plurality of peripheral ports 50 according to the connection status. In this case, the plurality of peripheral ports 50 in idle state can effectively reduce the power consumption of the internal components (such as the processing modules 10, etc.) of the docking station 1, and can extend a service life of the docking station 1.

In some examples, the step S200 may further include a step S210 (the monitoring module 20 generates an access signal) and a step S220 (the monitoring module 20 generates a non-access signal).

In some examples, the step S300 may include a step S310 (controlling the power supply module 30 to continuously output the power supply voltage and the power supply current to the processing module 10 according to the access signal) and a step S320 (controlling the power supply module 30 to interrupt an output voltage and an output current to the processing module 10 according to the non-access signal).

Specifically, in the present embodiment, the monitoring module 20 may generate an access signal when monitoring that the peripheral device 2 is connected to the peripheral port 50 (the step S210). The power supply control module 40 can control the power supply module 30 to continuously output the power supply voltage and the power supply current to the processing module 10 according to the access signal. Or, when the monitoring module 20 monitors that the peripheral device 2 is not connected to the plurality of peripheral ports 50, a non-connection signal is generated (the step S220). The power supply control module 40 controls the power supply module 30 to interrupt an output voltage and an output current to the processing module 10 according to the non-access signal. Thereby, it is convenient to control the working states of the processing module 10 and the plurality of peripheral ports 50 according to the access signal and the non-access signal.

In the present embodiment, the processing module 10 includes a video data processing module 110, an audio data processing module 120, and a graphic data processing module 130. The plurality of peripheral ports 50 can include a first peripheral port 510, a second peripheral port 520, and a third peripheral port 530. The video data processing module 110 can be connected to the first peripheral port 510, the audio data processing module 120 can be connected to the second peripheral port 520, and the graphic data processing module 130 is connected to the third peripheral port 530. Thereby, different peripheral ports can output different data, conveniently.

In the present embodiment, the monitoring module 20 may monitor the connection status of each of the n peripheral ports, and correspondingly generate a access signal Y or a non-access signal N. Thereby, Thereby, the power consumption of each of the plurality of peripheral ports can be easily and independently controlled. The specific implementation is described with reference to the above-mentioned embodiment of the docking station 1, details thereof will not be described herein.

In the present embodiment, connection status of the plurality of peripheral ports 50 can be monitored in real time through the monitoring module 20, that is, whether or not the plurality of peripheral ports 50 is connected to the peripheral device 2, and the power supply control module 40 controls control the power supply module 30 to output power to the processing module 10 and the plurality of peripheral ports 50 according to the connection status. In this case, the plurality of peripheral ports 50 in idle state can effectively reduce the power consumption of the internal components (such as the processing modules, etc.) of the docking station, and can extend a service life of the docking station.

Although the present disclosure has been specifically described above with reference to the accompanying drawings and embodiments, it should be understood that the above description is not limited to the present disclosure in any form. Those skilled in the art can make modifications and changes of the present disclosure as required without departing from the essential spirit and scope of the present disclosure, and these modifications and changes all fall within the scope of the present disclosure.

What is claimed is:

1. A low power docking station including a bus port and a plurality of peripheral ports, wherein the low power docking station is connected to a terminal through the bus port so as to obtain an input current and input data from the terminal, and the low power docking station is connected to a peripheral device through the plurality of peripheral ports so as to transmit an output current and output data, the low power docking station comprising:

a processing module, wherein one end of the processing module is connected to the bus port, and another end of the processing module is correspondingly connected to the plurality of peripheral ports; wherein the processing module is used for interpreting, transcoding, and distributing the input data correspondingly to the plurality of peripheral ports;

a monitoring module, wherein one end of the monitoring module is correspondingly connected to the plurality of peripheral ports; wherein the monitoring module is used for monitoring whether or not the plurality of peripheral ports is connected to the peripheral device, so as to correspondingly generate a corresponding one of a monitoring signal;

a power supply module, wherein one end of the power supply module is connected to yet another end of the processing module, and another end of the power supply module is connected to another one of the monitoring module; wherein the power supply module is used for supplying power to the plurality of peripheral ports, the processing module, and the monitoring module; and a power supply control module, wherein one end of the power supply control module is connected to yet another end of the monitoring module, and another end of the power supply control module is connected to yet another end of the power supply module; wherein the power supply control module is used for controlling the power supply module to output power according to the monitoring signal, so as to realize a power supply control for the processing module and the plurality of peripheral ports.

2. The low power docking station according to claim 1, wherein the plurality of peripheral ports is at least one of a driver port, a display port, a keyboard port, a printer port, a scanner port, a universal serial bus (USB) flash disk port, a hard disk port, a projector port, and an audio port.

3. The low power docking station according to claim 1, wherein the processing module includes a video data processing module, an audio data processing module, and a graphic data processing module; wherein the one end of the power supply module is correspondingly connected to the video data processing module, the audio data processing module, and the graphic data processing module.

4. The low power docking station according to claim 3, wherein the monitoring signal includes an access signal and a non-access signal; wherein, when the plurality of peripheral ports is connected to the peripheral device, the monitoring module generates the access signal; wherein, when the plurality of peripheral ports is not connected to the peripheral device, the monitoring module generates the non-access signal; wherein the power supply control module controls the power supply module to continuously output a power supply voltage and a power supply current to the processing module according to the access signal; wherein the power supply control module controls the power supply module to interrupt an output voltage and an output current to the processing module according to the non-access signal.

5. The low power docking station according to claim 4, wherein the plurality of peripheral ports includes a first peripheral port, a second peripheral port, and a third peripheral port; wherein the video data processing module is connected to the first peripheral port, the audio data processing module is connected to the second peripheral port, and the graphic data processing module is connected to the third peripheral port; wherein the monitoring module is correspondingly connected to the first peripheral port, the second peripheral port, and the third peripheral port; wherein the power supply module is correspondingly connected to the first peripheral port, the second peripheral port, and the third peripheral port; wherein the monitoring module monitors a connection state of each of the first peripheral port, the second peripheral port, and the third peripheral port, and correspondingly generates the access signal or the non-access signal.

6. The low power docking station according to claim 1, wherein the power supply module includes a voltage conversion module and a current limiting module, and the voltage conversion module and the current limiting module are connected in series.

* * * * *